(12) United States Patent
Kaplan et al.

(10) Patent No.: US 12,123,542 B2
(45) Date of Patent: Oct. 22, 2024

(54) COMPONENT RACK FOR A DISPLAY

(71) Applicant: Leon Hand-Crafted Speakers, Inc., Ann Arbor, MI (US)

(72) Inventors: Noah Kaplan, Ann Arbor, MI (US); Jonathan Halter, Howell, MI (US); George Konecny, Ann Arbor, MI (US); Ethan Kaplan, Ann Arbor, MI (US)

(73) Assignee: Leon Hand-Crafted Speakers, Inc., Ann Arbor, MI (US)

( * ) Notice: Subject to any disclaimer, the term of this patent is extended or adjusted under 35 U.S.C. 154(b) by 0 days.

(21) Appl. No.: 18/116,346

(22) Filed: Mar. 2, 2023

(65) Prior Publication Data

US 2023/0204151 A1 Jun. 29, 2023

Related U.S. Application Data

(63) Continuation of application No. 17/317,323, filed on May 11, 2021, now Pat. No. 11,598,478.

(60) Provisional application No. 63/023,530, filed on May 12, 2020.

(51) Int. Cl.
*F16M 11/04* (2006.01)

(52) U.S. Cl.
CPC ......... *F16M 11/045* (2013.01); *F16M 11/048* (2013.01)

(58) Field of Classification Search
CPC ... A47B 81/064; A47B 81/062; A47B 81/061; A47B 81/065; H02G 3/0487; H02G 3/0456; H02G 3/0443; H02G 3/0437; H04R 1/026; H04R 1/02; H04N 5/642; F16M 11/045

See application file for complete search history.

(56) References Cited

U.S. PATENT DOCUMENTS

| | | | | |
|---|---|---|---|---|
| 2,981,019 | A * | 4/1961 | Baird | B42F 17/08 40/124 |
| 5,900,715 | A * | 5/1999 | Roberts | H01M 10/46 320/115 |
| 6,497,586 | B1 * | 12/2002 | Wilson | H01R 13/73 439/532 |
| 9,265,346 | B1 * | 2/2016 | Forney | A47B 97/001 |
| 2014/0270910 | A1 * | 9/2014 | Sculler | H04N 5/64 403/109.1 |
| 2014/0294215 | A1 * | 10/2014 | Caldes | H04R 1/028 381/333 |
| 2016/0290553 | A1 * | 10/2016 | Helmikkala | F16M 11/045 |
| 2016/0366775 | A1 * | 12/2016 | Kolton | H05K 11/00 |
| 2017/0354054 | A1 * | 12/2017 | Kaplan | H04N 5/655 |
| 2020/0396526 | A1 * | 12/2020 | Vansickel | H04R 1/24 |
| 2021/0356068 | A1 * | 11/2021 | Kaplan | F16M 11/04 |

* cited by examiner

*Primary Examiner* — Christopher Garft
(74) *Attorney, Agent, or Firm* — FisherBroyles, LLP

(57) ABSTRACT

The present disclosure describes a component rack for, e.g., electronic devices. The component rack includes an upper rail; a lower rail, the upper rail and the lower rail extending relative to a first axis; at least one end cap coupled to an end of the upper rail and the lower rail; wherein the at least one end cap comprises a first panel slidably couplable to a second panel and movable along a second axis between a collapsed position and an extended position, the second axis extending transversely to the first axis.

13 Claims, 10 Drawing Sheets

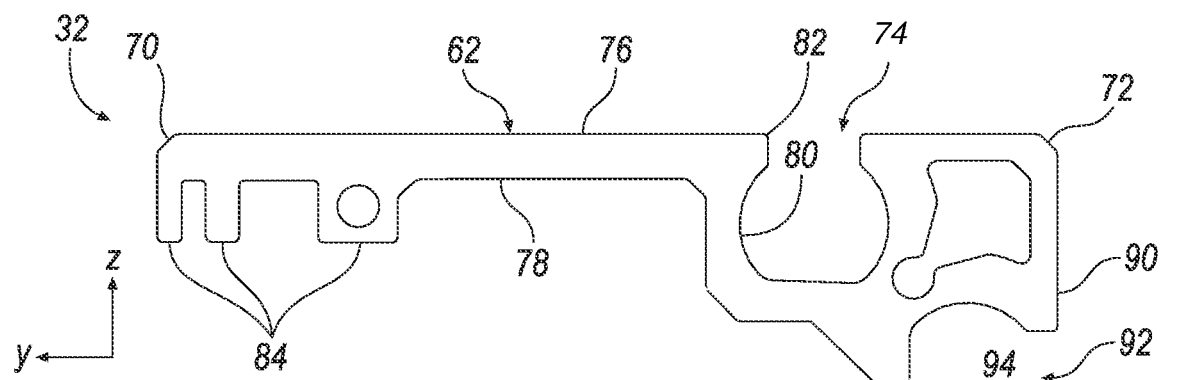
FIG. 9
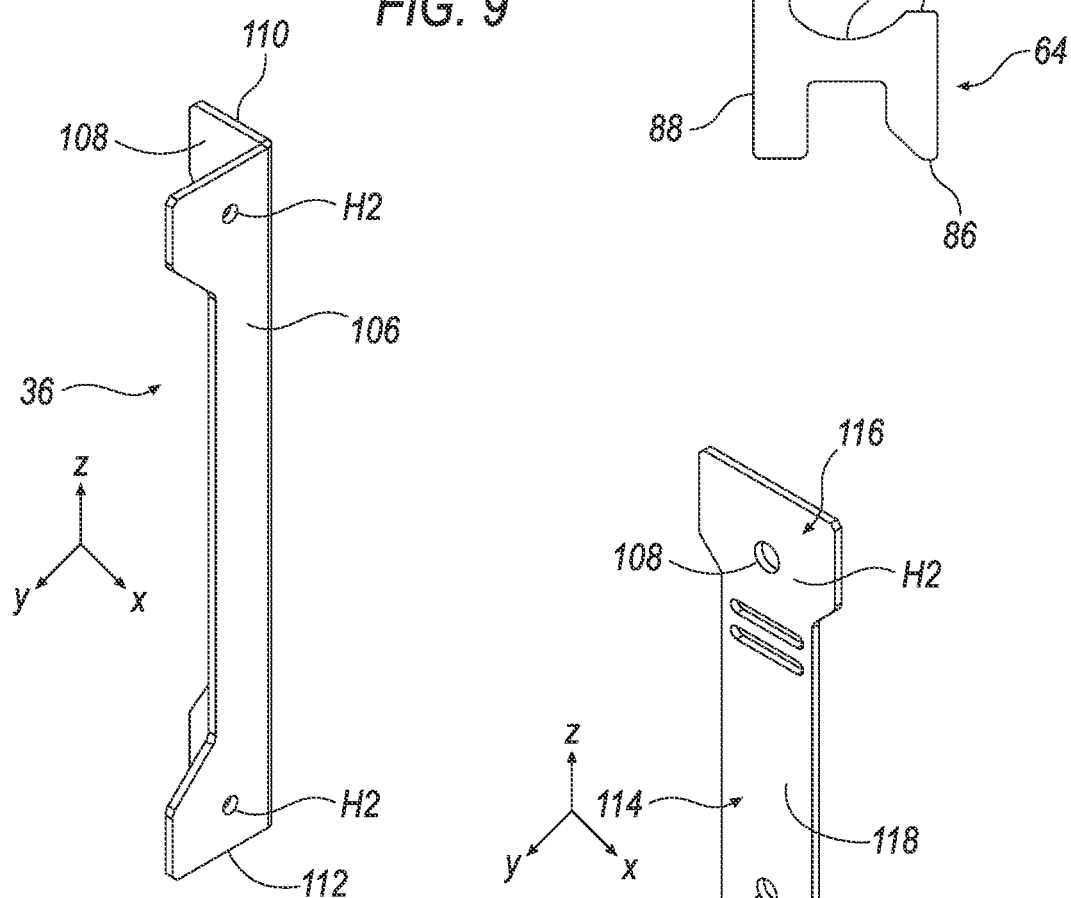
FIG. 10
FIG. 11

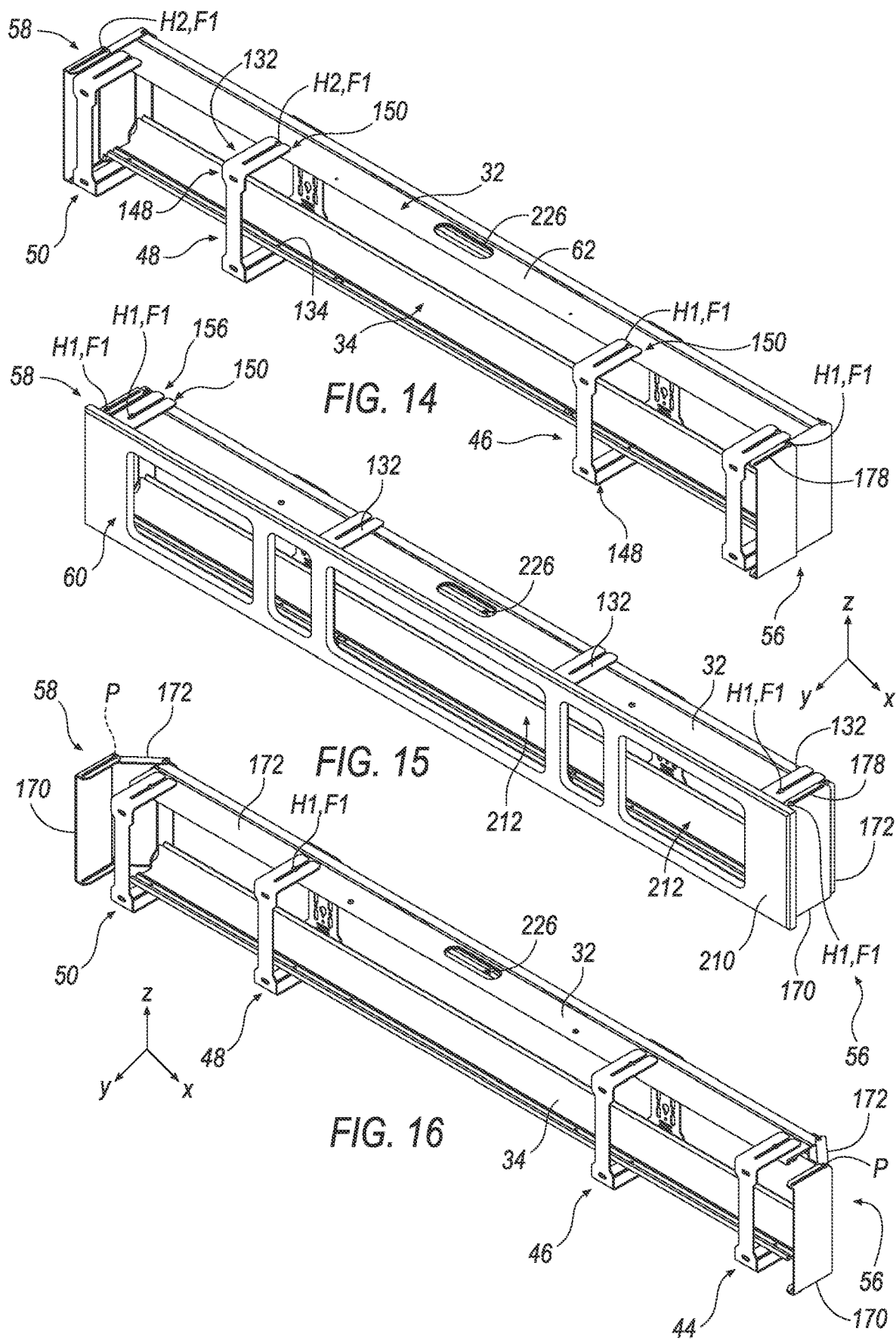

COMPONENT RACK FOR A DISPLAY

CROSS-REFERENCE TO RELATED APPLICATIONS

This application is a continuation of U.S. application Ser. No. 17/317,323 filed on May 11, 2021, which issued as U.S. Pat. No. 11,598,478, which claims priority to U.S. Provisional Patent Application No. 63/023,530, filed on May 12, 2020, the contents of each of which are hereby incorporated by reference in its entirety.

TECHNICAL FIELD

The present disclosure relates to a component rack for a display, and more particularly, a component rack adapted to carry modular electronic devices.

BACKGROUND

Audio electronics, camera electronics, gaming system electronics, auxiliary media streaming electronics, and the like may be used to enhance a user experience with a television and other display. As these and other electronics may improve a user's entertainment experience, these and other electronic devices each may have power and/or communication wiring which may become tangled and messy (a so-called bird's nest of wiring) which is not aesthetically appealing. Further, electronic devices come in a variety of sizes, e.g., width, that may not match the width of the associated display, which may provide a disordered or unappealing appearance.

Overview

According to an aspect of the disclosure, a component rack is disclosed that comprises: an upper rail; a lower rail, the upper rail and the lower rail extending relative to a first axis (e.g., x-axis); at least one end cap coupled to an end of the upper rail and the lower rail; wherein the at least one end cap comprises a first panel slidably couplable to a second panel and movable along a second axis (e.g., y-axis) between a collapsed position and an extended position, the second axis extending transversely to the first axis. For example, the first panel may include upper and lower flanges each having an elongated slot extending along the second axis, and the second panel may have a hole that receives a fastener (e.g., a pin or screw) that slidably engages with the slots. The provision of an adjustable end cap adjustable transversely to the upper and lower rails permits the component rack to accommodate electronic devices (e.g., soundbar, webcam, etc.) of various depths, and thereby provide a universal housing or enclosure for electronic devices.

Pursuant to an implementation, the first panel and the second panel are pivotable about a third axis relative to one another, wherein the third axis extends transversely to the first axis and the second axis. The provision of a pivotable end cap permits the component rack to accommodate electronic devices of various widths, to facilitate providing a universal enclosure for electronic devices. Further, the end cap can be articulated or pivoted to provide an appearance of a straight edge with respect to a front plate of the component rack, whereby the first panel is bent relative to the second panel and perpendicular to the front plate.

Pursuant to a further implementation, the at least one end cap is cantilevered from a rear edge of the second panel. For example, a rear end of the second panel may be fixed to the upper and lower rails, and a front end of the first panel may hang in spaced relation from the rails and the front plate. The cantilevered configuration allows the at least one end cap to be adjusted about at least two axes (e.g., the y-axis and the z-axis) without restriction, to facilitate an orderly appearance (e.g., forming a straight edge with the front plate) and customizing the component rack to the specifications of the electronic device(s) and/or the associated display (e.g., by adjusting in depth and/or width).

According to an exemplary approach, the upper rail has a wire routing slot extending therethrough. The wire slot allows wires or cords, for example, to be routed through the top of the component rack to the display, to bundle or otherwise organize messy wires, to help provide an orderly or neat appearance.

Pursuant to another approach, additionally or alternatively, a camera mount is disposed between the upper and lower rails. The camera mount includes a base mount and an adapter bracket slidably couplable to the base mount and movable relative to the base mount along the second axis (e.g., y-axis). The camera mount is configured to receive a camera and thus form an integrated unit that encloses or contains multiple electronic devices (e.g., a soundbar and a camera). A grille that is coupled to the upper and lower rails may comprise a mesh fabric having a window disposed in a region of the adapter bracket, which provides unobstructed access to the camera.

Pursuant to an exemplary approach, at least one yoke is slidably couplable to the upper and lower rails and movable along the second axis between a collapsed position and an extended position. By way of the at least one slidable yoke, the front plate can be displaced in a depth direction (e.g., along the y-axis) to accommodate for electronic devices of varying depths and/or to facilitate a flush alignment between the front surface of the front plate and a front face of the display. The at least one yoke includes a yoke plate extending relative to a third axis, the third axis extending transversely to the first axis and the second axis; and an upper flange and a lower flange extending along the second axis and respectively comprising an elongated slot.

According to another aspect, a component rack is disclosed that comprises: an upper rail; a lower rail, wherein the upper and lower rails extend relative to a first axis (e.g., x-axis); and at least one yoke slidably couplable to the upper and lower rails and movable along a second axis (e.g., y-axis) between a collapsed position and an extended position, the second axis extending transversely to the first axis; wherein the at least one yoke comprises: a yoke plate extending relative to a third axis (e.g., z-direction), the third axis extending transversely to the first axis and the second axis; an upper flange extending, relative to the second axis, from the yoke plate toward the upper rail; and a lower flange extending, relative to the second axis, from the yoke plate toward the lower rail. The provision of a slidable yoke permits a front plate attached thereto to be displaced in a depth direction (e.g., along the y-axis) to accommodate for electronic devices of varying depths and/or to facilitate a flush alignment between the front surface of the front plate and a front face of the display.

Pursuant to an implementation, the upper rail comprises first fasteners which retain the upper flanges of the at least one yoke to the upper rail, and the lower rail comprises second fasteners which retain the lower flanges of the at least one yoke to the lower rail.

A front plate is detachably couplable to the at least one yoke, wherein the front plate is displaceable relative to the second axis (e.g., y-axis) via movement of the at least one yoke relative to the upper and lower rails. For the detachable coupling of the front plate to the at least one yoke, the at least one yoke may comprise at least one hole, and the front plate may comprise a rear surface, facing the at least one yoke, wherein at least one pin extends from the rear surface and into the at least one hole of the at least one yoke. Additionally or alternatively, the front plate may have magnetic elements disposed on the rear surface that attract and magnetically couple to the yoke plate of the at least one yoke.

Pursuant to an implementation, each of the upper and lower rails comprise an elongated channel extending relative to the first axis (e.g., x-axis). The elongated channel may be disposed on a base of the rails. According to one example, a display mounting bracket is coupled to the upper rail via the elongated channel. According to another example, a wall mounting bracket is coupled to the upper and lower rails via the respective elongated channel. Fasteners in the form of a screw and nut, for example, may be used to fix the mounting brackets within the elongated channel(s).

At least one inner support may be provided that extends relative to the third axis and is coupled to the upper and lower rails. For example, each of the upper and lower rails comprise an elongated side extending relative to the third axis (e.g., z-axis) that has an elongated channel extending relative to the first axis (e.g., x-axis), wherein the at least one inner support is coupled to the upper and lower rails via the elongated channel. Fasteners in the form of a screw and nut, for example, may be used to fix the at least one inner support within the elongated (side) channels of the upper and lower rails.

Pursuant to an implementation, at least one end cap is coupled to an end of the upper and lower rails. The at least one end cap comprises a first panel slidably coupled to a second panel and movable along the second axis (e.g., y-axis) between a collapsed position and an extended position. Additionally or alternatively, the first panel and the second panel are pivotable about a pivot axis relative to one another, wherein the pivot axis extends parallel to the third axis.

Pursuant to an implementation, a camera mount is disposed between the upper and lower rails. The camera mount includes a base mount and an adapter bracket slidably couplable to the base mount and movable relative to the base mount along the second axis (e.g., y-axis).

According to another aspect, a component rack is disclosed that comprises: an upper rail; a lower rail, wherein the upper and lower rails extend relative to a first axis (e.g., x-axis); a first yoke slidably couplable to the upper and lower rails and movable between a collapsed position and an extended position; a second yoke slidably couplable to the upper and lower rails and movable between the collapsed position and the extended position; and a front plate detachably couplable to the first and second yokes, wherein each of the first and second yokes comprise: a yoke plate extending relative to a third axis (e.g., z-axis); an upper flange extending, relative to a second axis (e.g., y-axis), from the yoke plate toward the upper rail; and a lower flange extending, relative to the second axis, from the yoke plate toward the lower rail.

According to a further aspect, a component rack is disclosed that comprises: an upper rail; a lower rail, wherein the upper and lower rails extend relative to a first axis (e.g., x-axis); a first yoke slidably couplable to the upper and lower rails and movable along a second axis (e.g., y-axis) between a collapsed position and an extended position; a second yoke slidably couplable to the upper and lower rails and movable along the second axis between the collapsed position and the extended position; a front plate detachably couplable to the first and second yokes; a first end cap; and/or a second end cap, wherein each of the first and second yokes comprise: a yoke plate extending relative to a third axis (z-axis); an upper flange extending, relative to the second axis, from the yoke plate toward the upper rail; and a lower flange extending, relative to the second axis, from the yoke plate toward the lower rail, wherein the first end cap is coupled to first ends of the upper and lower rails, wherein the second end cap is coupled to second ends of the upper and lower rails.

Implementations of the disclosure may include combinations of the above-described features.

BRIEF DESCRIPTION OF THE DRAWINGS

While the claims are not limited to a specific illustration, an appreciation of the various aspects is best gained through a discussion of various examples thereof. Although the drawings represent illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 9 is a sectional view of an upper rail, along section lines IX-IX which are shown in FIG. 8.

FIG. 10 is a perspective view of a corner support.

FIG. 11 is a perspective view of an inner support.

FIG. 14 is a perspective view of the component rack in an extended position.

FIG. 15 is a perspective view of the component rack in a collapsed position.

FIG. 16 is a perspective view of the component rack with end caps in an articulated position.

DETAILED DESCRIPTION

Figure 1:
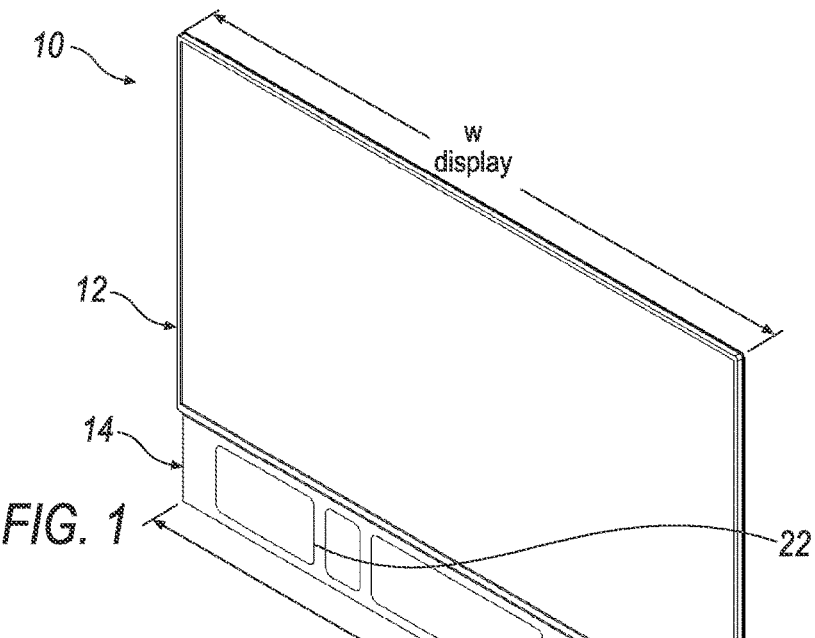
FIG. 1 is a perspective view of an entertainment system comprising a display and a component rack.
Figure 2:
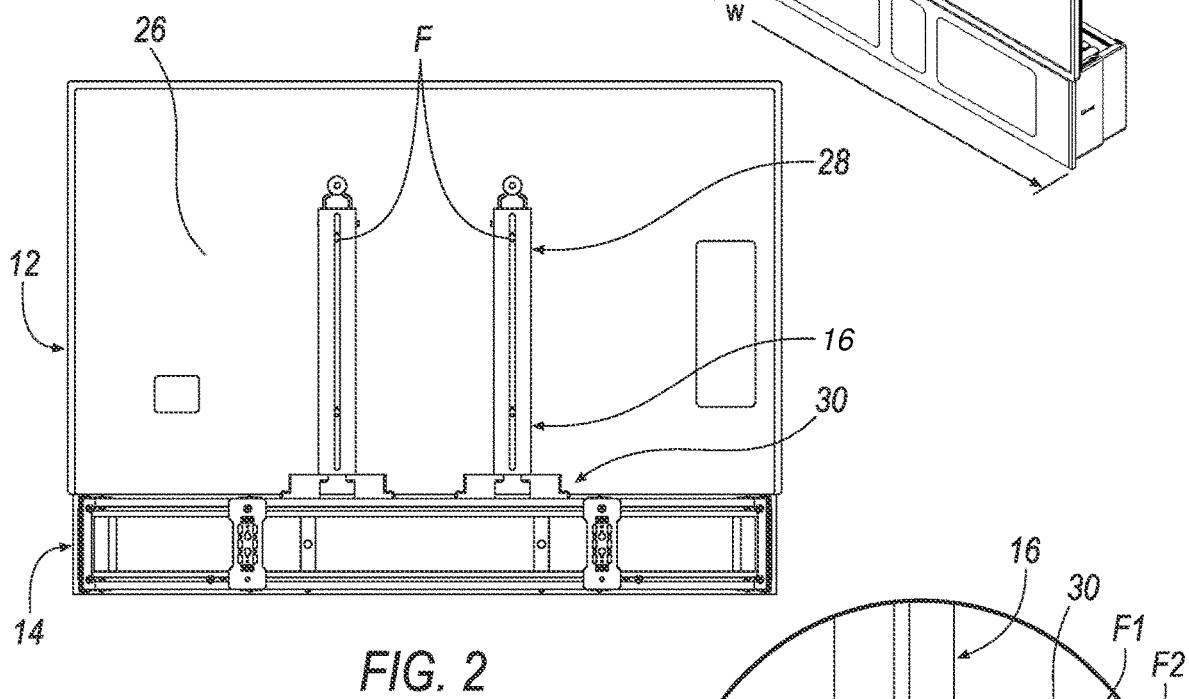
FIG. 2 is a rear view of the entertainment system, also illustrating a mounting bracket according to an example.

In the drawings, where like numerals and characters indicate like or corresponding parts throughout the several views, exemplary illustrations are shown in detail. The various features of the exemplary approaches illustrated and described with reference to any one of the figures may be combined with features illustrated in one or more other figures, as it will be understood that alternative illustrations that may not be explicitly illustrated or described may be able to be produced. The combinations of features illustrated provide representative approaches for typical applications. However, various combinations and modifications of the features consistent with the teachings of the present disclosure may be desired for particular applications or implementations.

Referring to FIGS. 1-4, an entertainment system 10 is shown that comprises a display 12 and a component rack 14 mounted to the display 12 via a display mounting bracket 16. Within component rack 14, electronics and wiring for the electronics may be retained and hidden from view of a user to increase an aesthetic presentation of the display 12 and component rack 14 (e.g., to provide an orderly and minimalistic presentation to the user). Electronics may include one or more audio loudspeakers, a set-top box (e.g., enabling cable or internet connection), a modem and/or wireless router, a camera, and/or the like. Each of these devices may require power and/or communication wiring which can be packaged within the component rack 14. To further improve the aesthetic presentation, component rack 14 may have dimensions that correspond with the display 12. Displays (such as display 12) may vary widely in width $w_{display}$. Further, a spacing S from a front face 18 of display 12 to a wall W may vary widely depending on a configuration of the display 12, a configuration of a mount 20 coupling the display 12 to wall W, and/or a configuration of the mounting bracket 16 coupling the component rack 14 to the display 12. The disclosed component rack 14 may be customizable in width w (to correspond to the width of the display 12), in depth d (so that a front surface 22 of component rack 14 is in a planar alignment (e.g., flush) with a front face 24 of display 12), and/or in height h (e.g., to accommodate loudspeakers of different sizes, to accommodate more or fewer electronics, and/or to accommodate other spatial constraints during installation).

Display 12 may comprise a monitor, a television (e.g., such as a flat-screen television), or the like. Other examples are possible. Display 12 may have a hole pattern on a rear face 26 that is in accordance with a Video Electronics Standards Association (VESA) mounting interface standard (e.g., also called a Flat Display Mounting Interface (FDMI)). Display mounting bracket 16 may be coupled to display 12 using fasteners F coupling the bracket 16 to holes of the hole pattern. Herein, the term fasteners should be construed broadly. E.g., fasteners F may be machine screws; however, fasteners F may comprise any combination of any suitable screws, pins, nails, rivets, and/or the like.

Display mounting bracket 16 may be any suitable bracket that couples the component rack 14 to the display 12 and that is sufficiently strong to bear a weight of the component rack 14 and its contents. One end 28 of bracket 16 may utilize a VESA mounting interface standard to couple to display 12; and another end 30 of bracket 16 may couple to mounting features of component rack 14, as discussed below. Display mounting bracket 16 may have any number of elements which may articulate with respect to one another. A non-limiting example of mounting bracket 16 is shown and described in U.S. patent application Ser. No. 15/616,646 which is incorporated herein in its entirety. Further, mounting bracket 16 is optional; e.g., in some embodiments of entertainment system 10, component rack 14 may be wall-mounted instead and may still have dimensions (e.g., w, d, h) that match or otherwise correspond to display 12.

Figure 5:
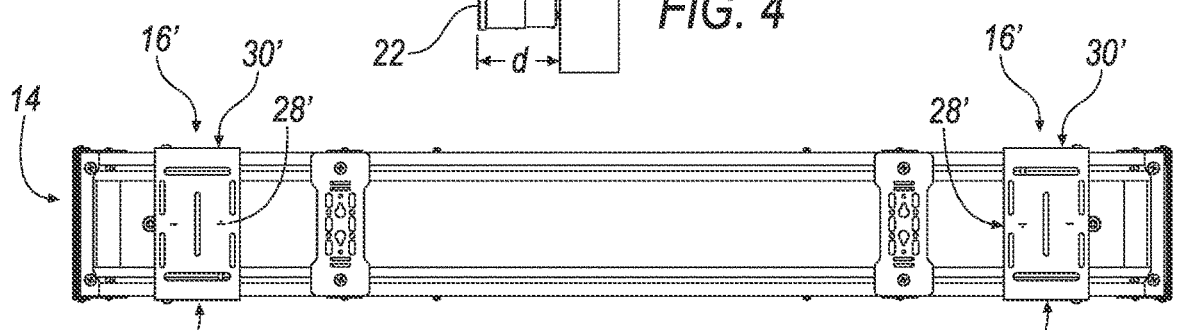
FIG. 5 is a rear view of the component rack illustrating a mounting bracket according to another example.
Figure 6:
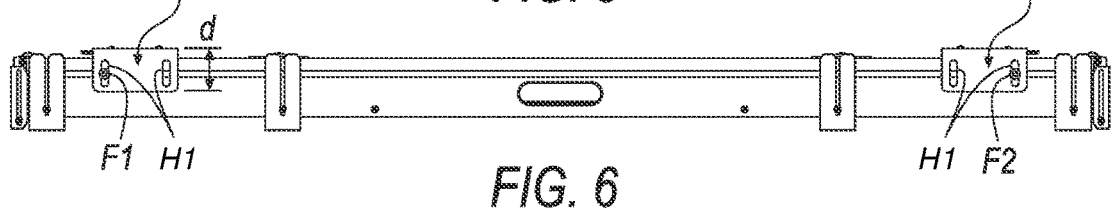
FIG. 6 is a top view of the component rack of FIG. 5.
Figure 7:
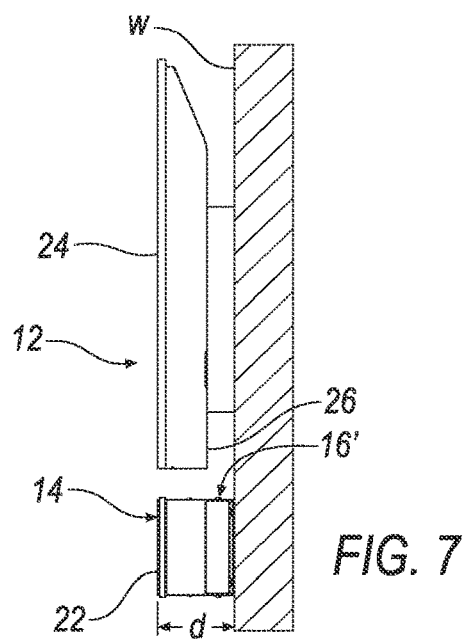
FIG. 7 is a side view of the entertainment system, wherein the display is mounted to a wall and the component rack is mounted to the wall via the mounting bracket separately from the display.

FIGS. 5-7 illustrate a non-limiting example of a wall-mounted component rack 14. According to the illustrated example, a wall mounting bracket 16' mounts the component rack 14 on the wall W at a distance from the display 12. Wall mounting bracket 16' includes a central portion 28' that engages with the wall W and two end portions 30' that engage with a top and bottom of the component rack 14. The central portion 28' has slots and/or holes H1 for receiving fasteners (e.g., screws, bolts, etc.) for fixing the bracket 16' on the wall W. The wall mounting bracket 16' may be coupled to the component rack 14 using fasteners F coupling end portions 30' to the component rack 14. The two end portions 30' have elongated slots or holes H1, which receive the fasteners F1, F2, to provide an adjustable depth d to facilitate a planar alignment (e.g., flush) of the front face 22 of the component rack 14 with the front face 24 of the display 12. The end portions 30' with elongated holes H1 allow the central portion 28' to be fixed to the wall, e.g., via fasteners F1, F2 engaging through one or more holes, at varying positions relative to the rear face 26 of the component rack 14.

Turning to FIGS. 8-13 and 20-22, component rack 14 may comprise a pair of rails (an upper rail 32 and a lower rail 34), a plurality of supports 36, 38, 40, 42 (e.g., other quantities are possible), a plurality of yokes 44, 46, 48, 50, a pair of end caps 56, 58, and a front plate 60. As discussed more below, component rack 14 may be presented as an assembly kit to customize its dimensions to correspond with display 12 which may be mounted to wall W (or suspended from a ceiling, etc.). Supports 36-42, yokes 44-50, and end caps 56-58 may be selected from a variety of sizes to adjust component rack 14 to a desired height. Rails 32-34 and end caps 56-58 may be positioned in a collapsed position, an extended position, or a position therebetween to adjust component rack 14 to a desired depth (d). And rails 32-34 may be cut and/or selected from a variety of sizes to adjust component rack to a desired width. Similarly, front plate 60 may be selected from a variety of sizes to provide a custom-width grille of the component rack 14 that is adjusted to a desired width (w) and/or height (h).

Figure 8:
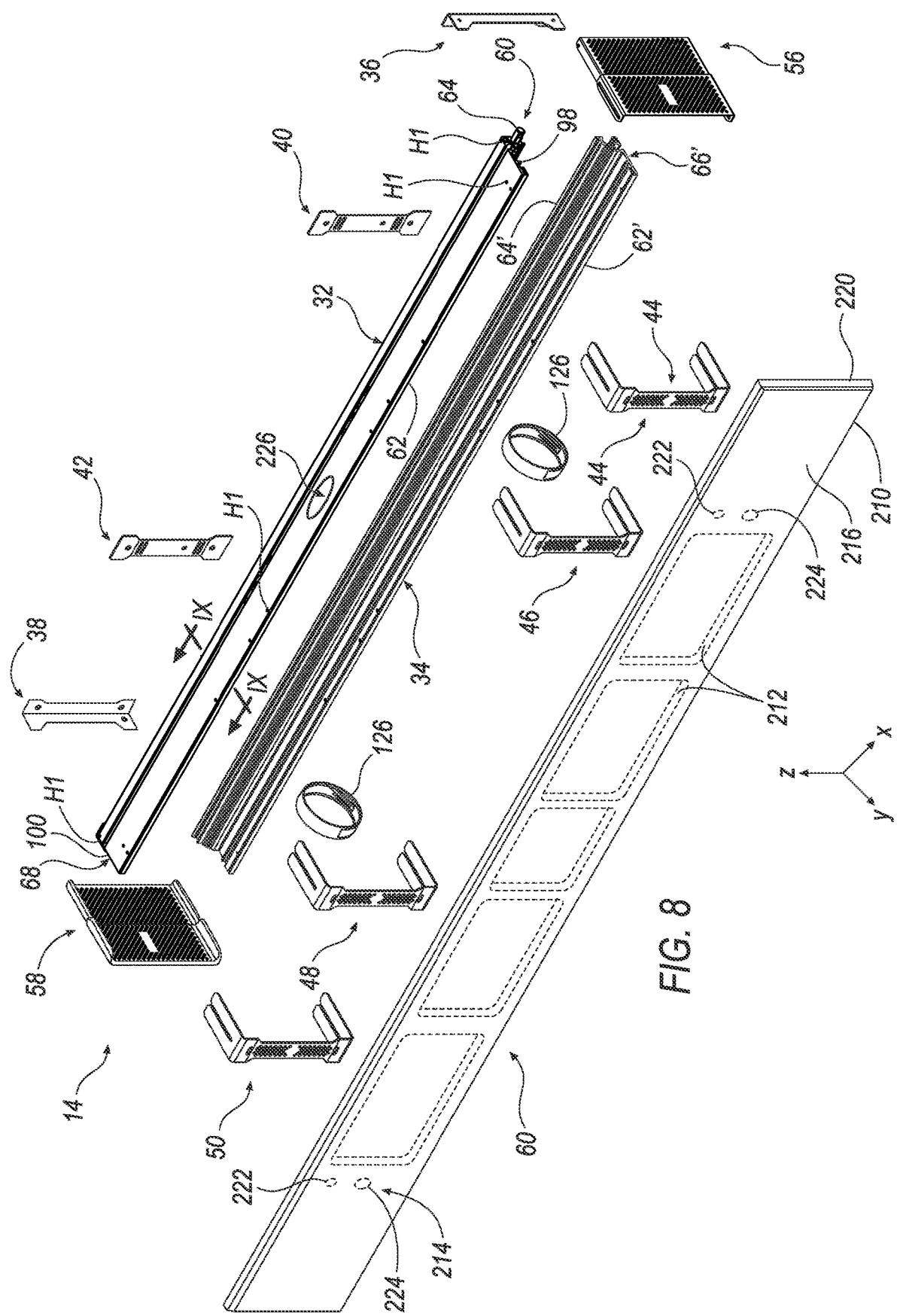
FIG. 8 is an exploded perspective view of the component rack.

As shown in FIGS. 8-9, upper rail 32 may comprise an elongated base 62 and an elongated side 64 coupled to the base 62 (generally having an L-shape). Base 62 and side 64 may extend between a first end 66 and a second end 68 along a first axis (x-axis)—e.g., horizontal and laterally with respect to display 12. Between a front edge 70 and a rear edge 72—spaced from one another in a depth direction, relative to a second axis (y-axis)—base 62 may comprise an elongated channel 74 extending along the first axis (x-axis)

between the first and second ends 66, 68 and from an upper side 76 of base toward a lower side 78 thereof. In at least one example, channel 74 is nearer the rear edge 72 and may be used to couple and retain end 30 of display mounting bracket 16 and end 30' of wall mounting bracket 16'. Channel 74 may comprise an enlarged portion 80 and a narrow portion 82 opening to the upper side 76 of the base 62. One or more ribs 84 may extend (relative to the x-axis) from lower side 78 of base 62 thereby enhancing the rail's strength and rigidity. Ribs 84 may be nearer front edge 70; however, this not required. Holes H1 of base 62 may be spaced from one another relative to the x-axis and at least some may be nearer the front edge 70. Holes H1 may be through-holes and/or threaded to receive fasteners F.

Elongated side 64 of upper rail 32 may extend from rear edge 72 to an opposite edge 86 with respect to a third axis (z-axis, and may have front side 88 and a rear side 90. An elongated channel 92 may be located between edges 72, 86—extending from the rear side 90 toward the front side 88 and between first and second ends 66, 68. Channel 92 may be similar to channel 74 (e.g., having an enlarged portion 94 and a narrow portion 96) and may be used to couple the upper rail 32 to lower rail 34 via supports 36-42.

Pursuant to an implementation, upper rail 32 comprises a wire slot 226 (see FIGS. 14-16 and 21) extending therethrough (e.g., from upper side 76 to lower side 78 of base 62) to route wires from inside the component rack 14 to the display 14. For example, wiring or cords (e.g., USB, audio, etc.) for electronics housed in the component rack 14 may be routed through the wire slot 226 to be plugged into the display 14. As such, the wire slot 226 may function to contain or bound the wires together to facilitate an orderly presentation.

Upper rail 32 may comprise hole H1 on a lateral face 98 (facing outwardly at first end 66) and another hole H1 one an opposite lateral face 100 (facing outwardly an opposite direction at second end 68, relative to the x-axis)). These holes H1 may be used during assembly, as described below.

Upper rail 32 may be comprised of any suitable material. According to an embodiment, the upper rail 32 comprises anodized aluminum; however, other metals and other nonmetal materials may be used. According to an embodiment, the upper rail 32 is configured so that it may be formed by an extrusion process.

According to an example, lower rail 34 may be similar or identical to upper rail 32 (see FIGS. 8 and 22); thus, it will not be described in detail (see like reference numerals). Lower rail 34 may be positioned as a mirror image of upper rail 32. For example, base 62 and a base 62' (of lower rail 34) may extend forwardly, and side 64 of upper rail 32 may extend downwardly, whereas a side 64' of lower rail 34 may extend upwardly. Bases 62, 62' may be parallel to one another, and sides 64, 64' may be positioned within a common plane; and channel 92 of side 64 and a channel 92' of side 64' each may face rearwardly.

According to an example, supports 36-42 comprise corner supports 36-38 and inner supports 40-42, wherein corner supports 36-38 may be identical and wherein inner supports 40-42 may be identical. One of each will be described herein for sake of brevity.

Corner support 36 (FIG. 10) may comprise an angle bracket—e.g., comprising an outboard side 106 and a rear side 108 coupled to one another and each extending vertically with respect to the z-axis. An upper portion 110 of each of outboard and rear sides 106, 108 may comprise a hole H2 (e.g., a through-hole); similarly, a lower portion 112 of each of outboard and rear sides 106, 108 may comprise a hole H2.

Corner support 36 may be coupled to first ends 66, 66' of upper and lower rails 32, 34 via fasteners F and holes H1, H2, and corner support 38 similarly may be coupled to second ends 68, 68' of upper and lower rails 32, 34 via fasteners F and holes H1, H2. E.g., rear sides 108 of corner supports 36, 38 may overlap sides 64, 64' (of upper and lower rails 32, 34), wherein outboard sides 106 overlap lateral faces 98-100, 98'-100' (of upper and lower rails 32, 34, respectively).

Figure 3:
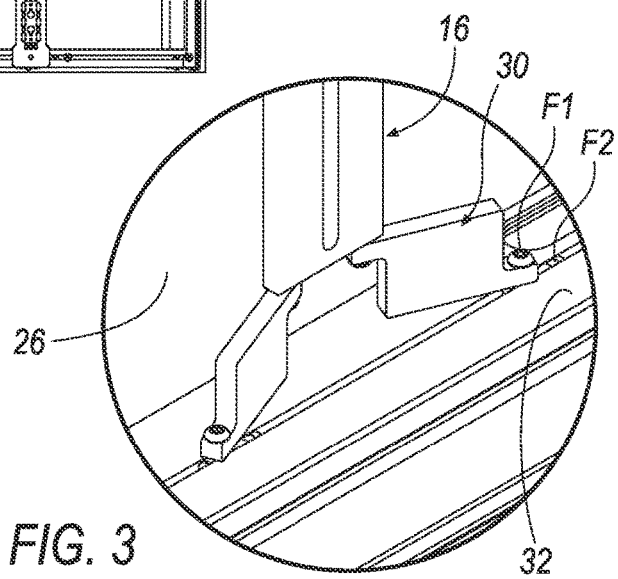
FIG. 3 is an enlarged perspective view of a portion of the mounting bracket.
Figure 4:
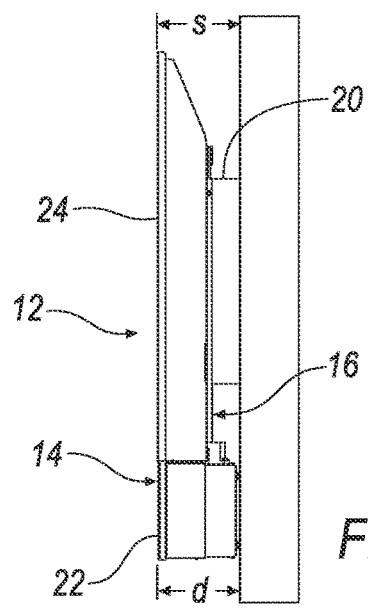
FIG. 4 is a side view of the entertainment system, wherein the display is mounted to a wall and the component rack is coupled to the display via the mounting bracket.

Inner support 40 (FIG. 11) may comprise a plate 114 having an upper region 116, a middle region 118 comprising one or more openings 120, and a lower region 122. Each of upper and lower regions may comprise a hole H3 (e.g., a through-hole). Each inner support 40 may be coupled to sides 64, 64' of each of upper and lower rails 32, 34 via fasteners F1 and fasteners F2 (an example of which is shown in FIG. 3). More particularly, fasteners F2 may be a captive nut which may be slid along channel 92, 92' (by inserting it via first or second end 66, 68), wherein each fastener F1 may be located in hole H3 and mated with a threaded hole in fastener F2.

Figure 17:
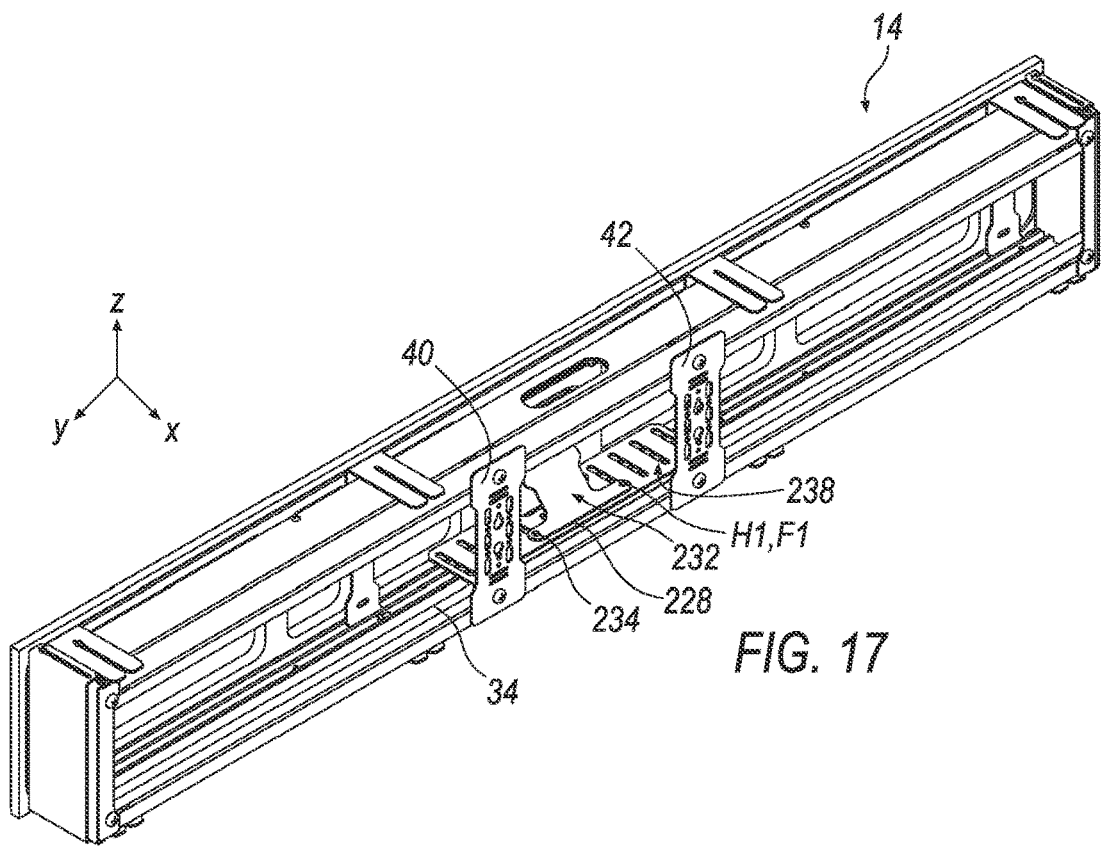
FIG. 17 is a rear perspective view of the component rack including a camera mount.
Figure 18:
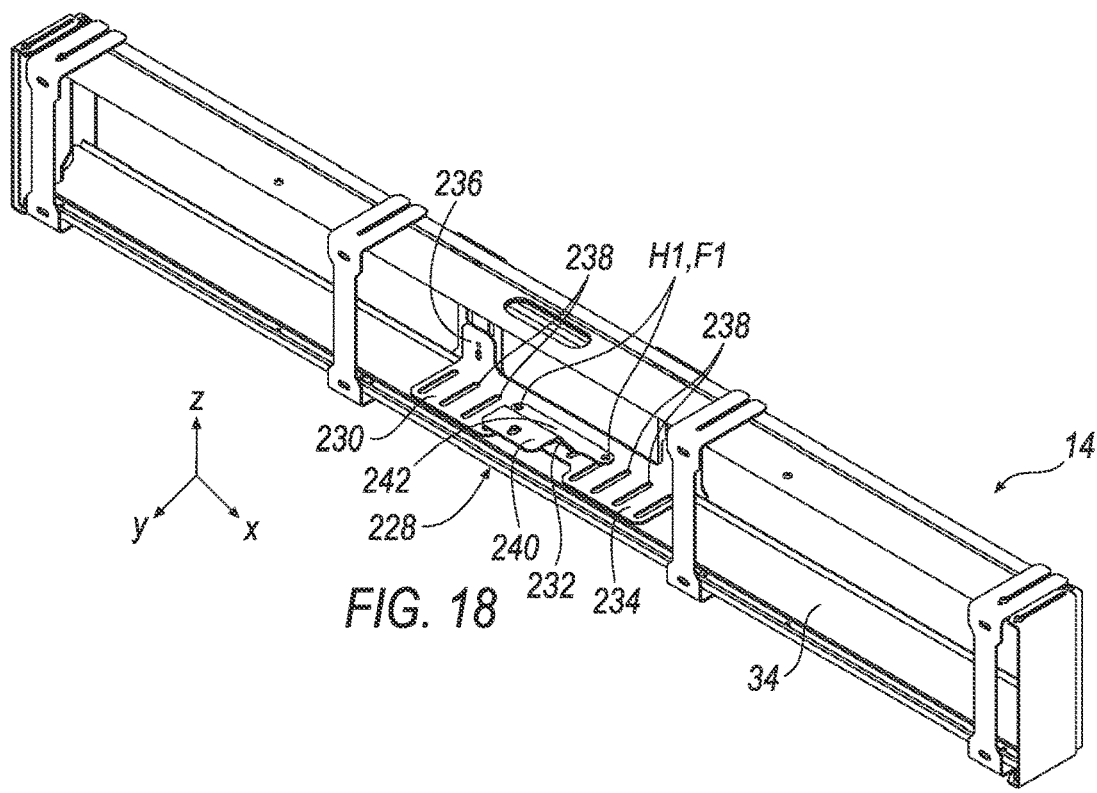
FIG. 18 is a front perspective view of the component rack including the camera mount, with the grille removed for clarity.

According to a non-limiting example, each of inner supports 40, 42 further comprise a hook-and-loop or other suitable strap 126 coupled to opening 120 (see FIG. 8). In this manner, strap 126 may be used to retain electronics from moving within component rack 14. Supports 36-42 may comprise any suitable material (e.g., including anodized metal). According to another example shown in FIGS. 17 and 20, the inner supports 40, 42 comprise a plurality of openings 120 in the middle region 118, which may function to secure different electronics within the component rack 14. For example, a keyhole-shaped opening may be used to secure one type of electronics (e.g., a soundbar), a slot-shaped opening to secure the strap for another type of electronics (e.g., a Bluetooth receiver), and a round opening to secure a threaded fastener for a different type of electronics (e.g., a cable box and/or a camera mount (see FIG. 18)). The inner supports 40, 42 are structured to accommodate a variety of different mounting options for various electronic components, and can be used to mount electronic components are designated areas within the component rack 14.

FIGS. 8, 12, 14-16, and 21-22 illustrates yokes 44-50. The yokes 44-50 are couplable to the upper and lower rails 32, 34 and movable along a second axis (y-axis) between a collapsed position (see FIG. 15) and an extended position (see FIG. 15). According to one example, each of the yokes 44-50 are identical or similar; therefore, only one will be described in detail (see also FIG. 12).

Figure 12:
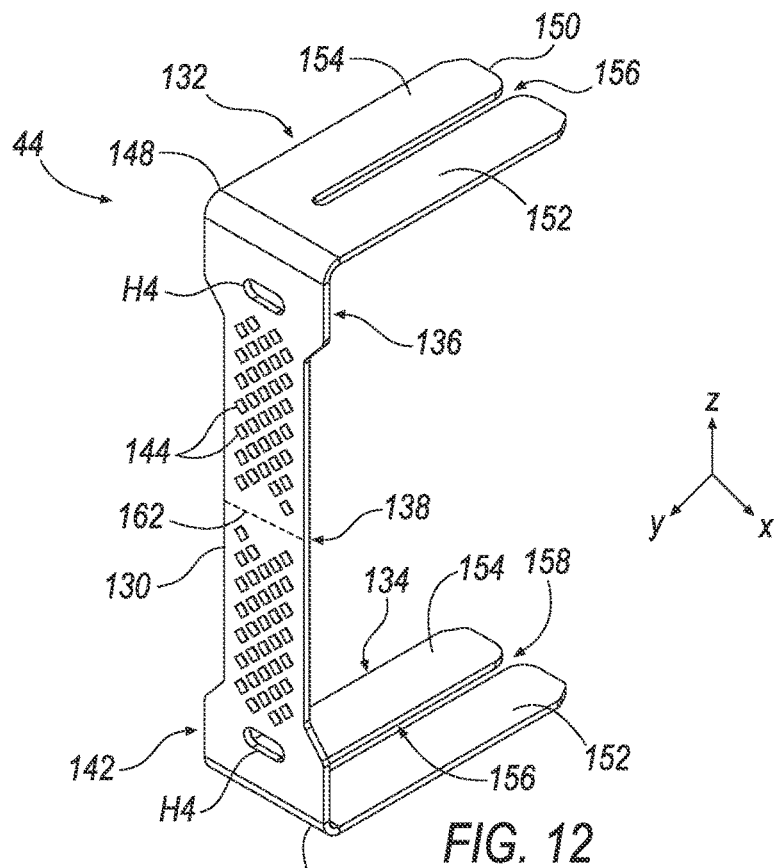
FIG. 12 is a perspective view of a yoke.

As shown in FIG. 12, yoke 44 may comprise a (yoke) plate 130 coupled to an upper flange 132 and coupled to a lower flange 134. The yoke plate 130 extends relative to a third axis (z-axis), and the upper and lower flanges 132, 134 extending along a second axis (y-axis). The upper flange 132 extends along the second axis (y-axis) from the yoke plate 130 toward the upper rail 32, and the lower flange extends along the second axis (y-axis) from the yoke plate 130 toward the lower rail 34. According to a non-limiting example, plate 130 may have a similar shape as plate 114 (however, this is not required). E.g., plate 130 may comprise an upper region 136 (comprising a hole H4), a middle region 138, and a lower region 142 (also comprising a hole H4). Plate 130 may have a pattern of through-holes 144 to facilitate the transmission of audio; however, this is not required.

Upper and lower flanges 132, 134 may be similar or identical; therefore, only one will be described in detail. Upper flange 132 may comprise a proximal end 146 coupled to an upper end 148 of plate 130, and upper flange 132 may extend to a distal end 150 (relative to the y-axis). Between proximal and distal ends 146, 150, upper flange 132 may bifurcate into two tongues 152, 154. A spacing between tongues 152, 154 may define a slot 156 which extends to an opening 158 of the slot 156 at distal end 150. Slot 156 facilitates displacement of front plate 60 with respect to upper and lower rails 32, 34—thereby enabling component rack 14 to move between the collapsed position (see FIG. 15) and the extended position (see FIG. 14). A fastener F1 positioned within slot 156 (and hole H1 of upper rail 32) may retain yoke 44 in a desired depth position. Lower flange 134 similarly may be coupled to a lower end 160 of plate 130 (and a fastener F1 may retain it to lower rail 34 in a similar fashion). The upper rail 32 comprises first fasteners F1 which retain the upper flanges 132 of the yokes 44-50 to the upper rail 32, and the lower rail 34 comprises second fasteners F1 which retain the lower flanges 134 of the yokes 44-50 to the lower rail 34.

According to at least one example, yoke 44 may be symmetrical about a midpoint 162. In this manner, yoke 44 may be inverted during assembly of component rack 14. As will be described more below, holes H4 may be used to retain front plate 60.

Yokes 44-50 may comprise any suitable material (e.g., including anodized metal). In at least one embodiment, yokes 44-50 comprise a ferromagnetic material.

Figure 13:
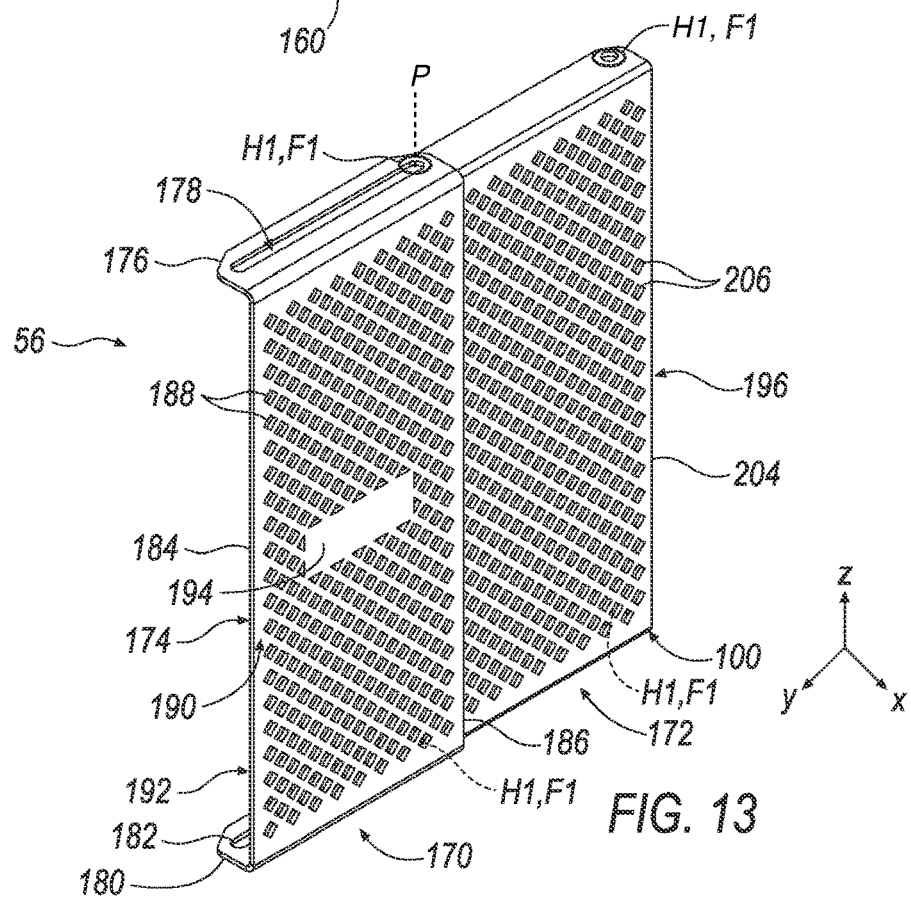
FIG. 13 is a perspective view of an end cap.

End caps 56, 58 may be similar or identical; therefore, only one will be described in detail. FIG. 13 illustrates end cap 56 (e.g., which may be a mirror image of end cap 58).

End cap 56 may comprise a first panel 170 and a second panel 172 which is adapted to slide relative to first panel 170 and move along the second axis (y-axis) between a collapsed position (see FIGS. 15 and 25) and an extended position (see FIGS. 13-14 and 23-24). Additionally, the first panel 170 and the second panel 172 are configured to pivot about a pivot axis P relative to one another (see FIG. 16), the pivot axis P extending in (e.g., parallel to) the third axis (z-axis). First panel 170 may comprise a planar base 174 (oriented vertically), an upper flange 176 comprising an elongated slot 178, and a lower flange 180 comprising an elongated slot 182. Base 174, flanges 176, 180, and slots 178, 182 may extend axially to the second axis (e.g., in the y-axis direction). Slots may extend between a front edge 184 and a rear edge 186 of first panel 170. Base 174 may comprise a pattern of through-holes 188 (e.g., extending from an outer surface 190 to an inner surface 192 of base 174); these through-holes 188 may be similar to through-holes 144; however, this is not required. Through-holes 188 may facilitate air-flow within component rack 14 to mitigate an overheating condition of electronics therein. According to the illustrated example, a center region 194 may be reserved for a logo (not shown in FIG. 13).

Second panel 172 similarly may comprise a planar base 196, an upper flange 198, and a lower flange 200. Upper and lower flanges 198, 200 each may comprise a pair of holes H1, wherein, respectively, one hole H1 is nearer a front edge 202 of the second panel 172 (and comprises a fastener F1 which is also through respective slot 178), and the other hole H1 is nearer a rear edge 204 to couple the second panel 172 to respective upper and lower rails 32, 34 (via fasteners F1). Base 196 also may comprise pattern of through-holes 206.

Figure 23:
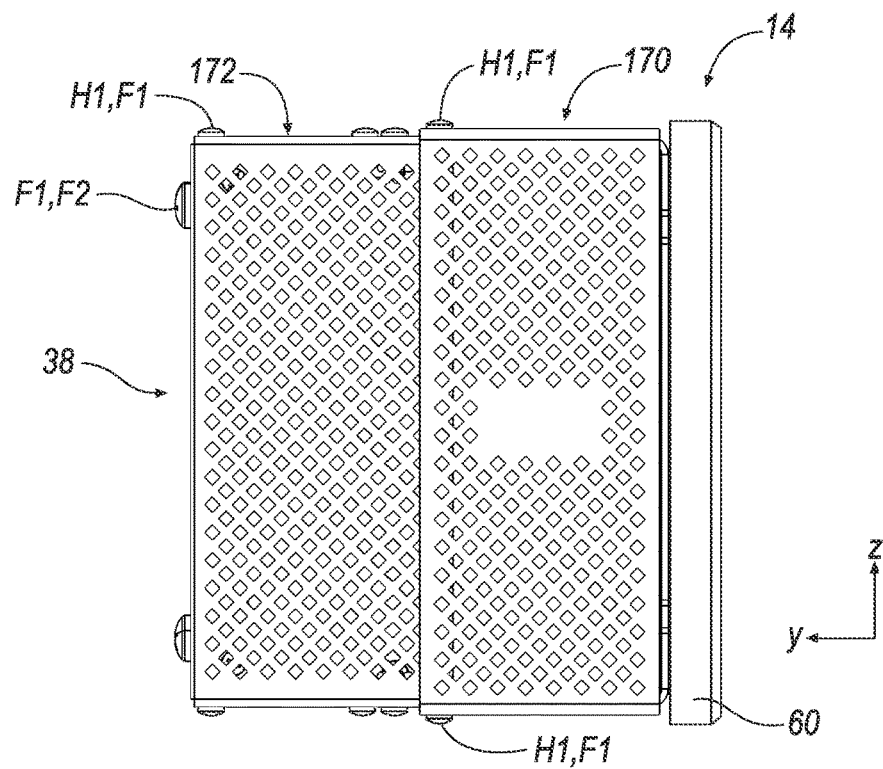
FIG. 23 is a left end view of the component rack.
Figures 24, 25:
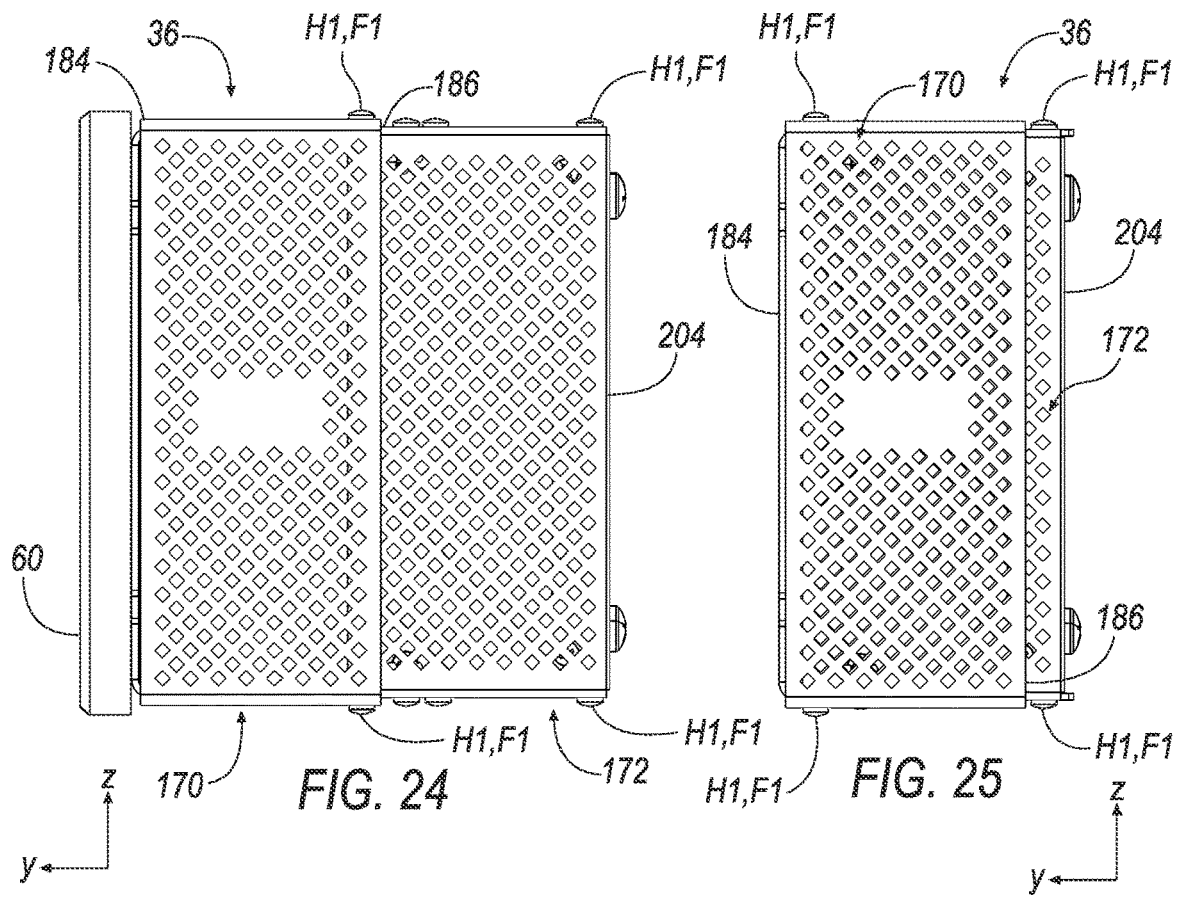
FIG. 24 is a right end view of the component rack, illustrating an end cap in an extended position.
FIG. 25 is a right end view of the component rack, illustrating the end cap in a collapsed position.

According to a non-limiting example, a height of second panel 172 may be less than a height of first panel 170. In this manner, upper and lower flanges 198, 200 (of second panel 172) may be located within (and slide relative to) upper and lower flanges 176, 180 (of first panel 170)—i.e., until fasteners F1 secure the panels 170, 172 relative to one another (e.g., according to a desired depth of component rack 14). The configuration of the first and second panels 170, 172 being slidable relative to one another allows the end caps 56, 58 to extend and retract, and thereby adjust in depth to accommodate electronics (e.g., a soundbar) and/or displays 14 of varying depths. This is shown FIGS. 14-15 and 23-25, wherein FIGS. 14 and 23-24 show the end caps 56, 58 and yokes 44-50 at an expanded position (e.g., a maximum extension) and FIGS. 15 and 25 show the end caps 56, 58 end yokes 44-50 at a collapsed position (e.g., a minimum extension). In the expanded position, the yokes 44-50 are fixed with the fasteners F1 in the holes H1 positioned within slot 156 near the distal end 150 of flanges 132, 134, and the end caps 56, 58 are fixed with fasteners F1 in holes H1 within slots 178, 182 of upper and lower flanges 176, 180 near rear edge 186 of first panel 170. In the collapsed position, the yokes 44-50 are displaced inwardly (e.g., along y-axis) and the fasteners F1 are fixed in holes H1 of slot 156 near proximal end 148 of flanges, 132, 134, and the end caps 56, 58 are displaced inwardly (e.g., along y-axis) are fixed with fasteners F1 in holes H1 within slots 178, 182 of upper and lower flanges 176, 180 near front edge 184 of first panel 170.

According to an implementation, end caps 56, 58 may be cantilevered from rear edge 204 of second panel 172 (e.g., coupled only to upper and lower rails 32, 34) and extending forwardly such that the front edge 184 of first panel 170 is adjacent front plate 60—e.g., thereby aesthetically shrouding from view any electronics within component rack 14 as shown in, e.g., FIG. 15. As shown in FIG. 16, the end caps 56, 58 may additionally be articulated or pivoted about pivot axis P relative to one another to accommodate for larger electronics and/or a front plate 60 (see FIG. 15) with an increased width w, and thereby provide for an appearance of a straight edge relative to the front plate 60. As shown in the illustrative example, the first panel 170 is pivoted or rotated relative to the second panel 172 by an angle, e.g., of about 45 degrees, to provide a straight edge in the second axis (y-axis) and perpendicular to the front plate 60. It will be appreciated that the first panel 170 may be pivoted in any number of angular positions about the pivot axis as desired. Accordingly, the end caps 56, 58 are configurable to shroud electronic devices (e.g., soundbars) of various sizes (e.g., width). End caps 56-58 may comprise any suitable material (e.g., including anodized metal). FIG. 16 additionally shows the yokes 44-50 at an intermediate position along the y-axis between the expanded and collapsed position.

As shown in FIGS. 8 and 15, front plate 60 (also referred to as a fascia plate) may be detachably couplable to yokes 44-50 and comprise a flat plate 210 comprising a plurality of apertures 212 which permit acoustic transmission and/or air flow within the component rack 14. In the illustration, five apertures 212 are shown; however, other suitable quantities may be used instead. The apertures 212 may have any suitable shape (e.g., here, they are rectangular having rounded corners), and the apertures 212 may be any suitable size and may have any suitable arrangement. When component rack 14 is assembled, front plate 60 may define width w—and for aesthetic purposes, front plate 60 may extend axially beyond end caps 56, 58 (e.g., in the x-axis direction).

Figure 19:
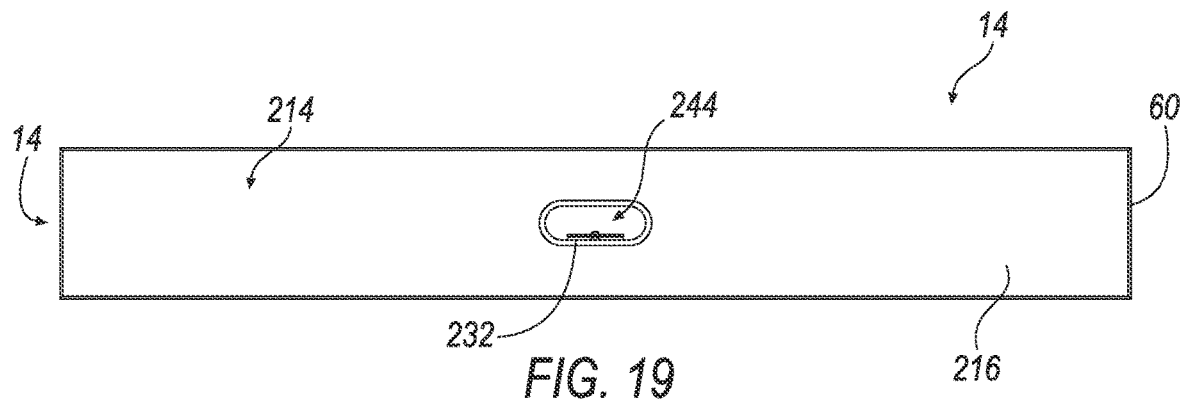
FIG. 19 is a front view of the component rack of FIG. 17, illustrating a window in a grille of the component rack.
Figure 20:
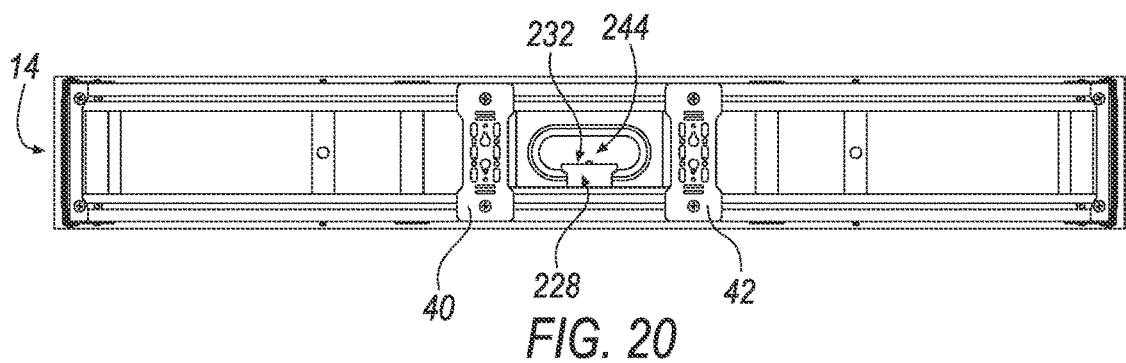
FIG. 20 is a rear view of the component rack of FIG. 17.
Figure 21:
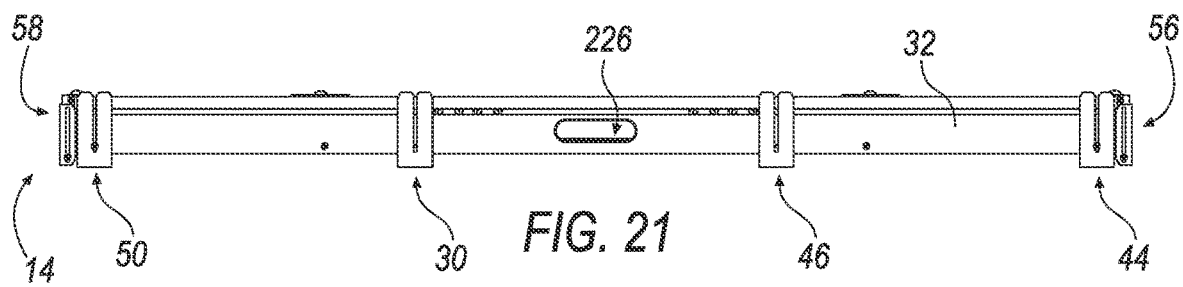
FIG. 21 is a top view of the component rack, with the grille removed for clarity.
Figure 22:
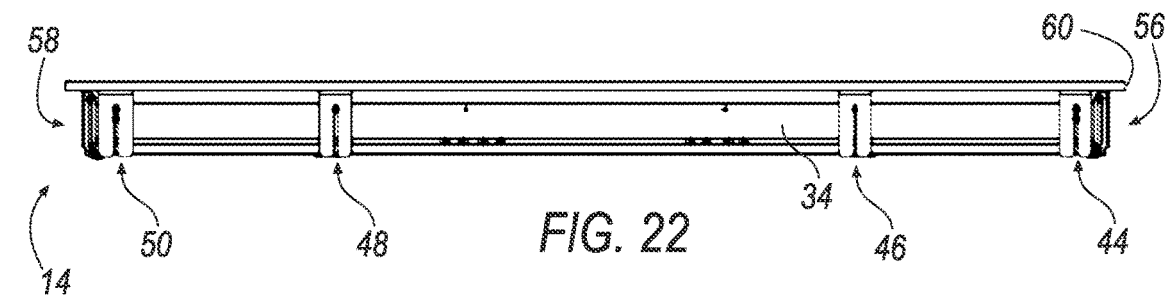
FIG. 22 is a bottom view of the component rack.

Over a front surface 214, front plate 60 may comprise a mesh overlay 216 (see FIG. 19). The overlay 216 may be comprised of any suitable acoustically transparent fabric or perforated material and may shroud electronics within component rack 14 from view. According to a non-limiting example, a rear surface 220 of front plate 60 may comprise a plurality of pins 222 extending rearwardly (e.g., in the y-axis direction) and a plurality of magnetic elements 224—wherein pins 222 and magnetic elements 224 are coupled thereto. When assembled, pins 222 may align with holes H4 of yokes 44-50 (see FIG. 12), and magnetic elements 224 may attract and magnetically couple to plates 130 of yokes 44-50. In this manner, front plate 60 easily may be coupled to and decoupled from the remainder of the component rack 14—enabling a user easy access to the electronics within.

Referring to FIGS. 17-20, the component rack 14 may include a camera mount 228, e.g., for receiving webcams. According to the illustrative example, the camera mount 228 includes a base mount 230 and an adapter bracket 232. The base mount 230 may lie on the lower rail 34 with a base portion 234 and include a flange portion 236 that attaches to the inner supports 40, 42 via a fastener F1 or the like. The base mount 230 includes one or more slots 238 (e.g., in base portion 234) that extend in the depth or y-axis direction (e.g., along the second axis) to accommodate adapter brackets 232 of various sizes and/or at various depths. In the illustrated example, a plurality of slots 238 are arranged spaced apart from one another in the x-axis direction (e.g., along the first axis) to accommodate adapter brackets 232 of various widths. The adapter bracket 232 includes a top end 240 that mounts a camera (not shown), and a bottom end 242 with holes H1 that receive a fastener F1 for securing to the base portion 234. A window or slot 244 may be formed in the front face 214 of the front plate 60, e.g., through the mesh overlay 216, to provide unobstructed access to the camera.

Figure 26:
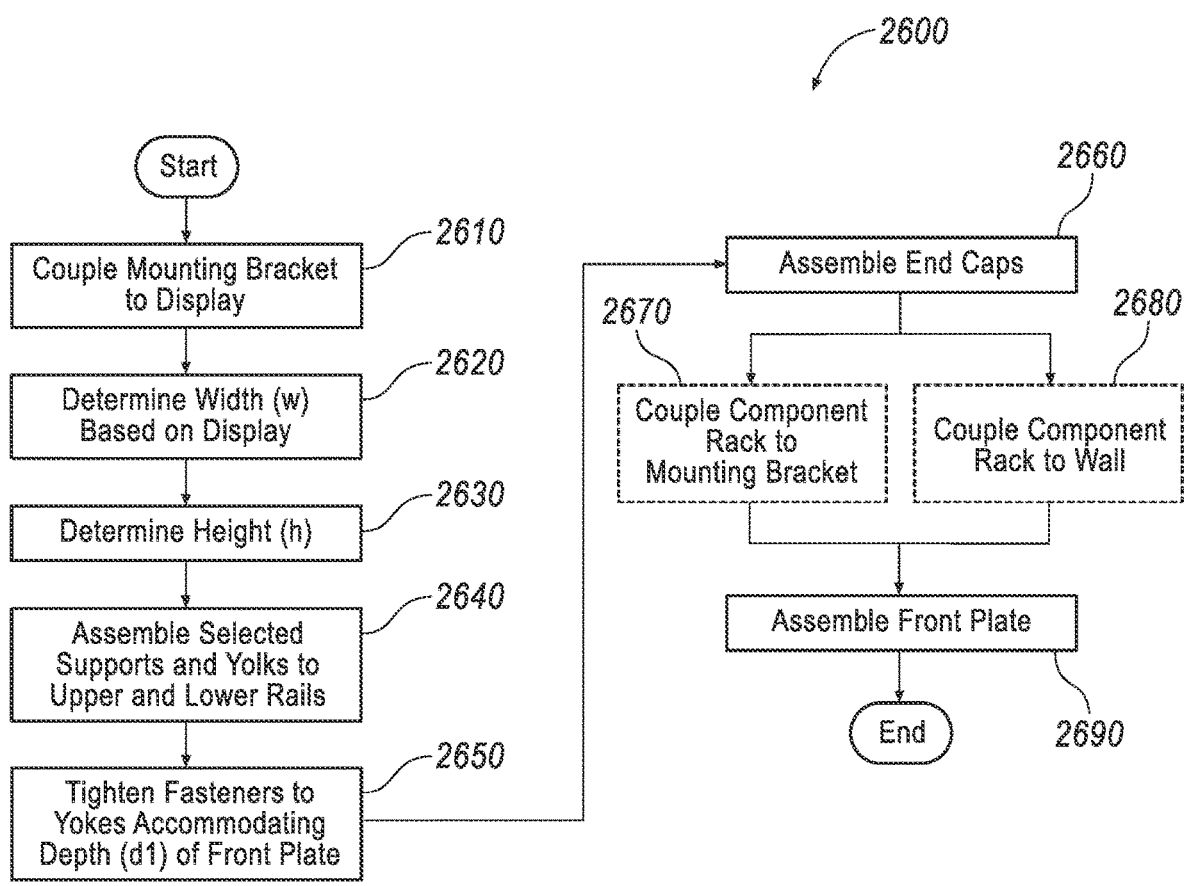
FIG. 26 is a process of a custom installation of the component rack.

An assembly method of component rack 14 is shown in FIG. 26. Process 2600 may begin with step 2610—display mounting bracket 16 may be coupled to display 12 (e.g., via a VESA mounting interface). Step 2610 is optional or may be modified to account for a wall-mounted component rack 14; e.g., as discussed above, component rack 14 alternatively may be mounted to wall W via wall mounting bracket 16'. While this step and other steps below may be performed by a consumer, an embodiment is described wherein a technician is employed in a custom installation. Thus, when step 2610 is completed, end 30 of display mounting bracket 16 may dangle slightly below the display 12.

In block 2620, a width (w) of display 12 may be determined. In some instances, the technician may perform measurements of display 12. In other examples, a manufacturing server previously may have received an order which comprises a width (w) measurement.

In step 2630, a height (h) of component rack 14 is determined. A variety of heights may be available. Based on height, the technician may determine supports 36-42, yokes 44-50, end caps 56-58, and/or front plate 60.

In step 2640, the supports 36-42 and yokes 44-50 may be assembled to upper and lower rails 32, 34; however, yokes 44-50 may not be fully tightened—e.g., so that yokes 44-50 (and consequently front plate 60) are displaceable relative to the z-axis. E.g., supports 36-38 and yokes 44-50 may utilize fasteners F1. Supports 40-42 may use fasteners F1, F2 (locating fasteners F2 within channels 92, 92') and retaining the supports 40-42 therein via fasteners F1. According to at least one embodiment, the yokes 46, 48 may be aligned (e.g., with respect to y-axis) with supports 40, 42, respectively; however, this is not required.

In step 2650, by moving the yokes 44-50 to and/or between the collapsed and extended positions, plates 130 of yokes 44-50 may be positioned so that display 12 overhangs component rack 14 by a depth (dl) (shown in FIG. 4), wherein depth (dl) defines a depth of the front plate 60 coupled to yokes 44-50. Once positioned accordingly, fasteners F1 of yokes 44-50 may be tightened. It should be appreciated that in at least one embodiment, yokes 44-50 are detachably couplable—e.g., since fasteners may include the use of machine screws or the like.

In step 2660, end caps 56, 58 may be assembled to upper and lower rails 32, 34 overlapping corner supports 36, 38.

Optional step 2670 or optional step 2680 may follow. In step 2670, the mounting bracket 16 may be coupled to upper rail 32—e.g., using fasteners F1, F2, wherein fasteners F2 are located in channel 74. In this embodiment, component rack 14 is suspended from display 12.

Alternatively, in step 2680, component rack 14 may be mounted to wall W using wall mounting brackets 16' coupling upper and lower rails 32, 34 to wall W.

Following either step 2670 or step 2680, front plate 60 may be detachably coupled to yokes 44-50, e.g., along the second or y-axis. More particularly, in at least one embodiment, pins 222 are located in holes H4 of yokes 44-50, and magnetic elements 224 are abutted to yokes 44-50 via a magnetically coupling. In this manner, front plate 60 may be assembled and disassembled by the user. Thereafter, process 2600 may end.

Other embodiments of component rack 14 exist. For example, component rack 14 may be oriented vertically with respect to display 12. Or component rack 14 may form part of another system.

Thus, there has been described a component rack that may be used with a display. The component rack is customizable in width w, in depth d and/or in height h. In this manner, the component rack may have an orderly and minimalistic presentation and be aesthetically pleasing.

Detailed embodiments of the present disclosure are disclosed herein; however, it is to be understood that the disclosed embodiments are merely exemplary; other embodiments may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Further, terms such as front, rear, left, right, top, bottom, upper, lower, forwardly, rearwardly, etc. are provided merely for purposes of explanation and to offer clarity regarding one orientation of the disclosed device; other orientations are possible.

It will be appreciated that the aforementioned apparatus may be modified to have some components removed, or may have additional components and steps added, all of which are deemed to be within the spirit of the present disclosure. Accordingly, even though the present disclosure has been described in detail with reference to specific examples, it will be appreciated that the various modifications and changes can be made to these examples without departing from the scope of the present disclosure as set forth in the claims. It is anticipated and intended that future developments will occur in the technologies discussed herein, and that the disclosed method, device and/or article will be incorporated into such future developments. Thus, the specification and the drawings are to be regarded as an illustrative thought instead of merely restrictive thought.

As used herein, spatial or directional terms such as "top," "bottom," "upper," "lower," "up," "down," and the like, relate to the illustrations shown in the figures and are not to be considered as limiting. Further, all numbers expressing dimensions, ratios and the like, used in the specification and claims, are to be understood to encompass tolerances and other deviations as represented by the term "about" or "approximately." Moreover, all ranges disclosed herein are to be understood to encompass any and all sub-ranges subsumed therein.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Further, the use of "at least one of" is intended to be inclusive, analogous to the term and/or. Additionally, use of adjectives such as first, second, etc. should be read to be interchangeable unless a claim recites an explicit limitation to the contrary.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A component rack, comprising:
an upper rail;
a lower rail, the upper rail and the lower rail extending relative to a first axis;
at least one end cap coupled to an end of the upper rail and the lower rail, wherein the at least one end cap comprises a first panel slidably couplable to a second panel and movable along a second axis between a collapsed position and an extended position, the second axis extending transversely to the first axis;
a grille coupled to the upper and lower rails, wherein the grille comprises a mesh fabric with a window through the mesh fabric, and
at least one yoke slidably coupled to the upper and lower rails, the at least one yoke is movable along the second axis,
wherein the yoke is configured to move between an extended position and a collapsed position such that a yoke plate extending relative to a third axis is arranged at a predetermined depth relative to a front face of a display, the second axis extending transversely to the first axis, and the third axis extending transversely to the first axis and the second axis.

2. The component rack of claim 1, further comprising a camera mount disposed between the upper and lower rails in a region of the window.

3. The component rack of claim 2, wherein the camera mount includes a base mount and an adapter bracket slidably couplable to the base mount and movable relative to the base mount along the second axis, and wherein the window is disposed in a region of the adapter bracket to provide unobstructed access to a camera.

4. The component rack of claim 2, further comprising at least one inner support extending relative to a third axis and coupled to the upper and lower rails, the third axis extending transversely to the first axis and the second axis, wherein the camera mount is secured to the at least one inner support.

5. The component rack of claim 4, wherein each of the upper and lower rails comprise an elongated side extending relative to the third axis that has an elongated channel extending relative to the first axis, wherein the at least one inner support is coupled to the upper and lower rails via the elongated channel.

6. The component rack of claim 1, wherein the yoke is configured to have a collapsed position or an extended position.

7. The component rack of claim 1, wherein the upper rail has a wire routing slot extending therethrough.

8. The component rack of claim 1, wherein at least one flange of the at least one yoke is secured to at least one of the upper rail and the lower rail at the predetermined depth, the at least one flange extending transversely from the yoke plate along the second axis.

9. The component rack of claim 1, wherein when the first panel is moved relative to the second panel, a front edge of the first panel is adjacent to the grille.

10. The component rack of claim 1, further comprising securing at least one inner support to a rear side of the upper and lower rails, the at least one inner support extending relative to the third axis.

11. The component rack of claim 10, wherein the at least one inner support is secured to the upper and lower rails via a fastener that engages into an elongated channel extending relative to the first axis that is provided on an elongated side of the upper and lower rails extending relative to the third axis.

12. The component rack of claim 1, further comprising arranging a camera mount relative to one of the upper and lower rails, and securing the camera mount to an inner support.

13. The component rack of claim 1, further comprising coupling a display mounting bracket to the upper rail.

* * * * *